United States Patent
Tanaka et al.

(10) Patent No.: US 11,954,244 B2
(45) Date of Patent: Apr. 9, 2024

(54) INFORMATION PROCESSING DEVICE AND INFORMATION PROCESSING METHOD

(71) Applicant: SONY GROUP CORPORATION, Tokyo (JP)

(72) Inventors: Yuki Tanaka, Tokyo (JP); Yasutaka Fukumoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/922,764

(22) PCT Filed: May 6, 2021

(86) PCT No.: PCT/JP2021/017398
§ 371 (c)(1),
(2) Date: Nov. 1, 2022

(87) PCT Pub. No.: WO2021/235232
PCT Pub. Date: Nov. 25, 2021

(65) Prior Publication Data
US 2023/0161401 A1    May 25, 2023

(30) Foreign Application Priority Data
May 18, 2020    (JP) ................................. 2020-086775

(51) Int. Cl.
*G06F 3/01*    (2006.01)
(52) U.S. Cl.
CPC .................................. *G06F 3/011* (2013.01)
(58) Field of Classification Search
CPC .......... G06F 3/011; G06F 3/012; G06F 3/017; A63F 13/428; A63F 13/55; G06T 19/00
See application file for complete search history.

(56) References Cited

U.S. PATENT DOCUMENTS

| 8,503,086 | B2 * | 8/2013 | French ............... A63B 24/0062 |
| | | | 73/379.04 |
| 2011/0306413 | A1 | 12/2011 | Bickerstaff et al. |

(Continued)

FOREIGN PATENT DOCUMENTS

| JP | 2011-258161 A | 12/2011 |
| JP | 4848515 B2 | 12/2011 |
| JP | 2020-054823 A | 4/2020 |
| JP | 6691258 B1 | 4/2020 |
| WO | 2011/122214 A1 | 10/2011 |

OTHER PUBLICATIONS

Ratliff, "Ring Fit Adventure | Beginnia and Transient Temple | Part 2", Oct. 31, 2019, https://www.youtube.com/watch?v=rwoPYAXvOyw.*

(Continued)

*Primary Examiner* — Ryan A Lubit
(74) *Attorney, Agent, or Firm* — CHIP LAW GROUP

(57) ABSTRACT

The present disclosure provides a device and the like for performing processing for eliminating the deviation between postures of an object and a user without deteriorating the user's sense of immersion as much as possible in a scene where an object operated in a virtual space receives some kind of interference. An information processing device according to one aspect of the present disclosure includes an operation mode determination unit, an instruction posture calculation unit, and an object motion determination unit. The operation mode determination unit determines an operation mode for the first object. The instruction posture calculation unit calculates an instruction posture for the first object based on a posture of an operator of the first object. The object motion determination unit determines the posture of the first object based on the instruction posture when the operation mode is determined to be a first operation mode and without being based on the instruction posture when the operation mode is determined to be a second operation mode. Further, the operation mode determination unit (Continued)

switches the operation mode to the first operation mode when it is determined that the instruction posture satisfies a predetermined condition.

15 Claims, 10 Drawing Sheets

(56) References Cited

U.S. PATENT DOCUMENTS

| | | | |
|---|---|---|---|
| 2012/0155705 A1 | 6/2012 | Latta et al. | |
| 2018/0065017 A1* | 3/2018 | Murdock | A61B 5/744 |
| 2020/0348385 A1* | 11/2020 | Schindler | G01S 17/46 |
| 2020/0368616 A1* | 11/2020 | Delamont | H04N 13/239 |

OTHER PUBLICATIONS

Wii Sports/Boxing, https://strategywiki.org/wiki/Wii_Sports/Boxing#Knockouts_(KO).*
Ratliff, "Ring Fit Adventure | Beginnia and Transient Temple | Part 2", Oct. 31, 2019, https://www.youtube.com/watch?v=rwoPYAXvOyw (Year: 2019).*
Wii Sports/Boxing, https://strategywiki.org/wiki/Wii_Sports/Boxing#Knockouts_(KO) (Year: 2006).*
International Search Report and Written Opinion of PCT Application No. PCT/JP2021/017398, dated Jul. 6, 2021, 11 pages of ISRWO.
"RingFit Adventure Nintendo Switch", MAE Channel, YouTube, URL: https://www.youtube.com/watch?v=nxWMxf13VpQ, Oct. 19, 2019.

* cited by examiner

Fig. 2
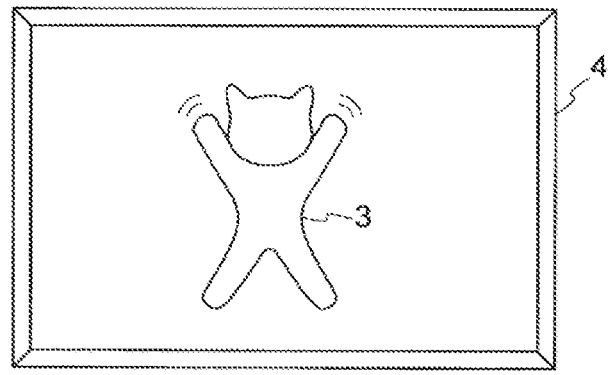
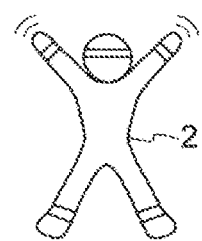

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/017398 filed on May 06, 2021, which claims priority benefit of Japanese Patent Application No. JP 2020-086775 filed in the Japan Patent Office on May 18, 2020. Each of the above-referenced applications is hereby incorporated herein by reference in its entirety.

TECHNICAL FIELD

The present disclosure relates to an information processing device, an information processing method, and a program.

BACKGROUND ART

There are devices that recognize a user's posture using a technique such as motion capture, regard the posture and its changes as operation signals, and move an object in a virtual space, such as a character in a game. Using the device, the motion of the character can follow the motion of the user, and the user's sense of immersion in the game is improved.

With such a conventional technique, there is no problem when the object can be freely moved without restrictions, but there is a problem when the object is expected to receive some kind of interference. For example, when a plurality of objects exist in a virtual space, the conventional technology often processes these objects so that they pass through each other without colliding with each other. In this case, the user will recognize the difference from the real world, and the user's sense of immersion will be impaired. Therefore, it is necessary to realize natural motion such as the objects colliding with each other and overturning.

CITATION LIST

Patent Literature

[PTL 1]
JP 4848515B

SUMMARY

Technical Problem

However, problems also arise when objects are overturned. For example, when an object is overturned, there is a deviation between the posture of the object and the posture of the user, so the sense of immersion decreases as compared with a case where the object was moving like his or her own body. In addition, if the object is adjusted to the user's posture as soon as it gets up from the overturned state in order to eliminate the deviation, the motion of the object becomes unnatural. This is also one of the factors that impair the user's sense of immersion.

In response to the above problem, the present disclosure provides a device and the like for performing processing for eliminating the deviation between postures of an object and a user without deteriorating the user's sense of immersion as much as possible in a scene where an object operated in a virtual space receives some kind of interference.

Solution to Problem

An information processing device according to one aspect of the present disclosure includes an operation mode determination unit, an instruction posture calculation unit, and an object motion determination unit. The operation mode determination unit determines an operation mode for the first object. The instruction posture calculation unit calculates an instruction posture for the first object based on a posture of an operator of the first object. The object motion determination unit determines the posture of the first object based on the instruction posture when the operation mode is determined to be a first operation mode and without being based on the instruction posture when the operation mode is determined to be a second operation mode. Further, the operation mode determination unit switches the operation mode to the first operation mode when it is determined that the instruction posture satisfies a predetermined condition.

As a result, it is possible to create the feel of a game that the operator voluntarily changes his or her posture in order to make the object operable again and prevent a decrease in the sense of immersion. Moreover, it is possible to eliminate the deviation between the postures of the object and the user.

Further, the operation mode determination unit may switch the operation mode to the first operation mode when the operation mode is the second operation mode and it is determined that the instruction posture matches the posture of the first object.

Further, the object motion determination unit may cause the first object to take a predetermined pose when the operation mode is determined to be the second operation mode, and the operation mode determination unit may switch the operation mode to the first operation mode when it is determined that the instruction posture matches the pose.

Further, the operation mode determination unit may switch the operation mode to the first operation mode when it is determined that a position or moving distance of the operator satisfies a predetermined condition and the instruction posture satisfies a predetermined condition.

The information processing device may further include an object generation unit that generates a second object that moves within the virtual space according to movement of the operator when the operation mode is switched to the second operation mode, and the operation mode determination unit may switch the operation mode to the first operation mode when it is determined that a position of the second object matches a position of the first object and the instruction posture satisfies a predetermined condition.

Further, the object motion determination unit may change the posture of the first object according to the instruction posture when the operation mode is determined to be the first operation mode.

Further, the operation mode determination unit may switch the operation mode from the first operation mode to the second operation mode when a predetermined event occurs in the virtual space.

Further, the operation mode determination unit may determine occurrence of the event based on a positional relationship between the first object and a third object existing in the virtual space.

Further, an appearance of the first object may change when the operation mode is switched.

Further, the object motion determination unit may cause the first object to take a plurality of poses in order when the operation mode is determined to be the second operation mode, and the operation mode determination unit may switch the operation mode to the first operation mode when it is determined that the instruction posture matches the plurality of poses in the order taken by the first object.

Further, the operation mode determination unit may switch the operation mode to the first operation mode when a signal from a predetermined object is received and it is determined that the instruction posture satisfies a predetermined condition.

The information processing device may further include an image generation unit that generates an image representing at least a partial area of the virtual space, and the object motion determination unit may move the first object into the area when the operation mode is switched from the first operation mode to the second operation mode.

Further, the information processing device may further include an object generation unit that generates a fourth object after the operation mode is switched to the second operation mode, and the object motion determination unit may adjust a position of the fourth object to a past position of the first object within the area.

The information processing device may further include an object generation unit that generates a fifth object indicating a trajectory of movement of the first object within the area after the operation mode is switched to the second operation mode.

In another aspect of the present disclosure, there is provided an information processing method including: determining an operation mode for a first object operated in a virtual space; calculating an instruction posture for the first object based on a posture of an operator of the first object; and determining the posture of the first object based on the instruction posture when the operation mode is determined to be a first operation mode and without being based on the instruction posture when the operation mode is determined to be a second operation mode, wherein the operation mode is switched to the first operation mode when the operation mode is the second operation mode and it is determined that the instruction posture satisfies a predetermined condition.

In another aspect of the present disclosure, there is provided a program including: determining an operation mode for a first object operated in a virtual space; calculating an instruction posture for the first object based on a posture of an operator of the first object; and determining the posture of the first object based on the instruction posture when the operation mode is determined to be a first operation mode and without being based on the instruction posture when the operation mode is determined to be a second operation mode, wherein the operation mode is switched to the first operation mode when the operation mode is the second operation mode and it is determined that the instruction posture satisfies a predetermined condition.

BRIEF DESCRIPTION OF DRAWINGS

FIG. 2 is a diagram for explaining operation of an operating object.

DESCRIPTION OF EMBODIMENTS

Hereinafter, embodiments of the present disclosure will be described with reference to the drawings.

(One Embodiment of Present Invention)

Figure 1:
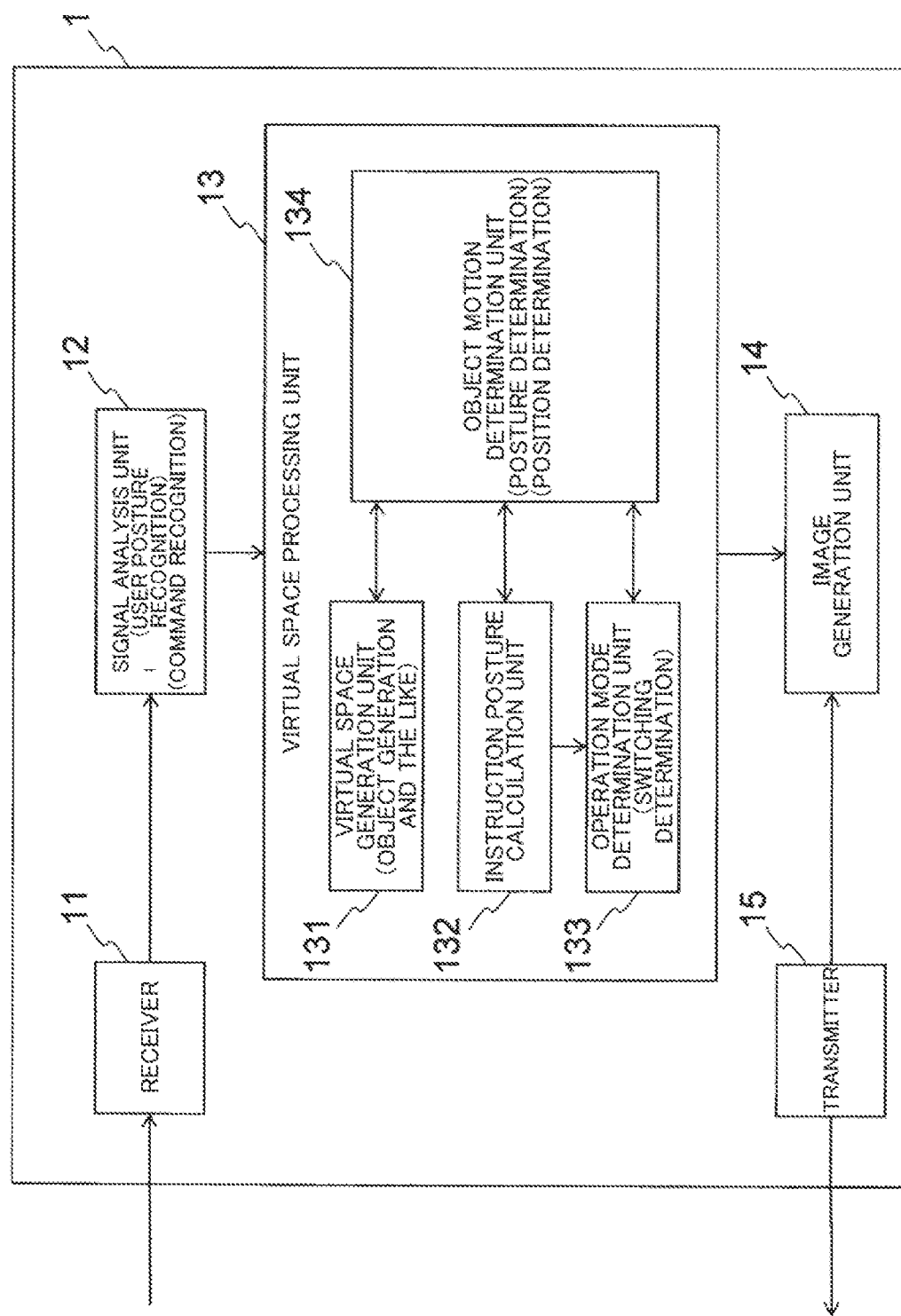
FIG. 1 is a diagram showing a configuration example of an information processing device according to one embodiment of the present invention.

FIG. 1 is a diagram showing a configuration example of an information processing device according to one embodiment of the present invention. An information processing device 1 in the example of FIG. 1 includes a receiver 11, a signal analysis unit 12, a virtual space processing unit 13, an image generation unit 14 and a transmitter 15. The virtual space processing unit 13 includes a virtual space generation unit (object generation unit) 131, an instruction posture calculation unit 132, an operation mode determination unit 133, and an object motion determination unit 134.

The information processing device 1 according to the present disclosure generates a virtual space and objects that exist within the virtual space, like conventional game devices. One or more objects are generated, and at least one of them is operated by the user of the information processing device 1. Hereinafter, an object operated by a user will be referred to as an "operating object (first object)". An object that is not operated by the user is referred to as a "non-operating object (third object)". The user of the information processing device 1 can also be said to be the operator of the operating object.

FIG. 2 is a diagram explaining the operation of an operating object. A user 2 and an operating object 3 are shown in FIG. 2. Since the operating object 3 exists in the virtual space, it is shown in an image 4 displaying the virtual space.

In many game devices, a user moves an operating object via an input device such as a controller or a touch panel, but in the present disclosure, the user moves the operating object using his or her posture. In other words, the information processing device 1 determines the posture of the operating object based on the posture of the user. In the present disclosure, the posture of the operating object follows the posture of the user. That is, the posture of the operating object and the posture of the user are synchronized. For example, as shown in FIG. 2, when the user 2 waves his or her hand, the operating object 3 also waves its hand. In order to perform such an operation, the information processing device 1 receives information from a device capable of recognizing the posture of the user.

Figure 3:
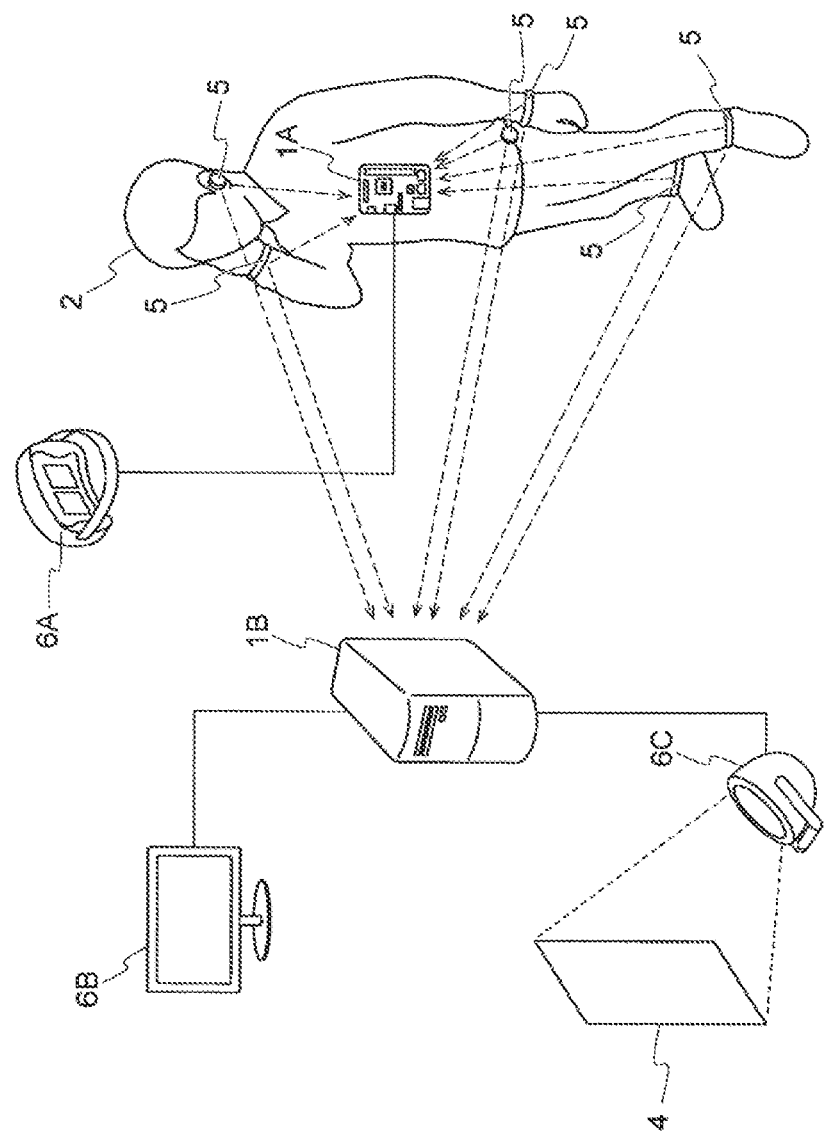
FIG. 3 is a diagram showing an example of means for recognizing a user's posture.

FIG. 3 is a diagram showing an example of means for recognizing a user's posture. FIG. 3 shows an example in which sensors 5 attached to the body of the user 2 recognize the posture of the user 2. The technique of the example of FIG. 3 is known as a motion capture system. The sensors 5 may be, for example, known sensors such as an acceleration sensor, an angular velocity sensor, an IMU (Inertial Measurement Unit) sensor, or the like.

In FIG. 3, data indicating the positional coordinates of each sensor 5 is transmitted from each sensor 5 to information processing devices 1A and 1B. The information processing devices 1A and 1B recognize the posture of the user 2 based on the positional coordinates of each sensor 5 after synchronizing the sensors 5.

Note that the positional coordinates of each sensor attached to the user indicate the position of each part of the user's body. The information processing device 1 may determine the position of the user as a whole, such as the user's standing position, based on the positional coordinates of each sensor. In other words, the positional coordinates of the user as a whole may be uniquely determined from the positional coordinates of the arms, the positional coordinates of the feet, the positional coordinates of the head, and the like. In the present disclosure, the position of the user as a whole is described as the user's position.

The user's position may be the position of any part of the body. It may be the positional coordinates of a specific sensor, or may be calculated based on a predetermined formula such as the average of the positional coordinates of each sensor. The information processing device 1 may also calculate the user's moving distance between measurement time points based on the user's position at each measurement time point. As a result, processing such as moving an object in the virtual space based on the moving distance of the user is also possible.

Various embodiments of the information processing device 1 can be assumed. For example, as shown in FIG. 3, data from each sensor 5 may be received by a portable information processing device 1A such as a smartphone via wired or wireless communication, and after determining the posture of the operating object 3, the operating object 3 may be displayed on an image display device such as a head-mounted display 6A. Alternatively, as shown in FIG. 3, data from each sensor 5 may be received by a fixed information processing device 1B such as a cloud server via wireless communication, and after determining the posture of the operating object 3, the operating object 3 may be displayed on an image display device such as a monitor 6B or a projector 6C.

Further, in FIG. 3, data from the sensors 5 is directly transmitted to the information processing devices 1A and 1B. A device for recognizing a posture may be prepared separately from the information processing device 1, and each sensor may transmit data to the device.

The method of recognizing the user's posture is not limited to the motion capture system. For example, a well-known technique is known in which a user is photographed by a 3D camera or the like, and information indicating the posture of the user, such as a skeleton, is obtained from the photographed image. A device capable of generating information indicating a posture such as a skeleton may be used.

The information processing device 1 determines the posture of the operating object based on the user's posture thus obtained. The information processing device 1 may recognize the user's posture as an instruction to the virtual space, and may execute a special event in the virtual space based on the user's posture. For example, an event such as using a special item in the game may be performed.

Instructions other than moving the operating object need not be based on the user's posture. For example, instructions such as using a special item in the virtual space or changing the orientation of the image displaying the virtual space may be performed via an input device such as a keyboard, a mouse, or a controller.

Figure 4:
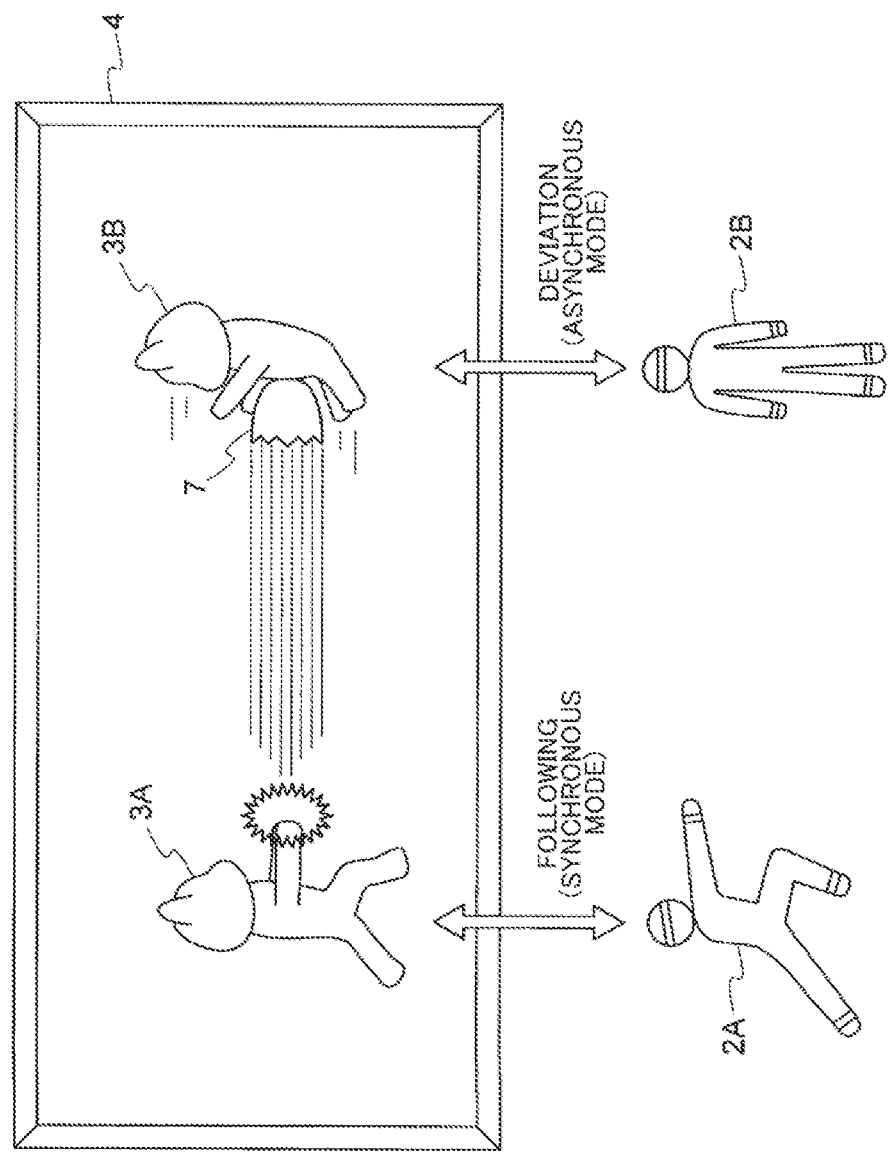
FIG. 4 is a diagram showing a usage example of an information processing device.

FIG. 4 is a diagram showing a usage example of the information processing device 1 FIG. 4 shows an example of using the virtual space as a fighting game. In FIG. 4, an image 4 showing the inside of a virtual space shows operating objects 3A and 3B operated by users 2A and 2B, respectively. The postures of the operating objects 3A and 3B are synchronized with the postures of the users 2A and 2B, respectively. The users 2A and 2B can also be said to be operators of the operating objects 3A and 3B, respectively.

As shown in FIG. 4, when the user 2A performs a specific posture or motion, the information processing device 1 that has detected this performs specific processing. Note that a specific motion means that a specific posture has changed to another specific posture. In the example of FIG. 4, the information processing device 1 that has detected a specific posture or motion generates a non-operating object 7 and moves it away from the operating object 3A. Then, when the non-operating object 7 contacts the operating object 3B, the information processing device 1 overturns the operating object 3B.

Overturning the operating object 3B means that the postures of the user 2B and the operating object 3B deviate from each other. Therefore, the sense of unity between the user 2B and the operating object 3B is lost, and the sense of immersion in the virtual space of the user 2B is reduced compared to when the user 2B moves the operating object 3B like his or her own body. Further, in order to eliminate the deviation, if the operating object 3B is adjusted to the posture of the user 2B as soon as the operating object 3B gets up from the overturned state, the motion of the operating object 3B becomes unnatural. This is also one of the factors that impair the sense of immersion of the user 2B.

Therefore, in the present disclosure, the user is encouraged to voluntarily adjust the posture of the user to the posture of the operating object. When a predetermined event such as a collision occurs, the information processing device 1 asynchronizes the posture of the user and the posture of the object. Then, instructions to the operating object are ignored until the user's posture matches the posture of the operating object. When the posture of the user matches the posture of the operating object, synchronization is performed again. The user will lose the game if the operating object cannot be operated. Therefore, the user voluntarily adjusts the posture to the posture of the operating object in order to be able to operate the operating object again. Instructions other than moving the operating object may be accepted.

In order to realize such processing, the information processing device 1 manages an operation mode related to the operation on the operating object, and synchronizes the postures of the user and the operating object when the operation mode is a synchronous mode (first operation mode). The information processing device determines the posture of the operating object regardless of the posture of the user when the operation mode is an asynchronous mode (second operation mode). The operation mode is switched when a certain mode switching event such as an object collision occurs.

Figure 5:
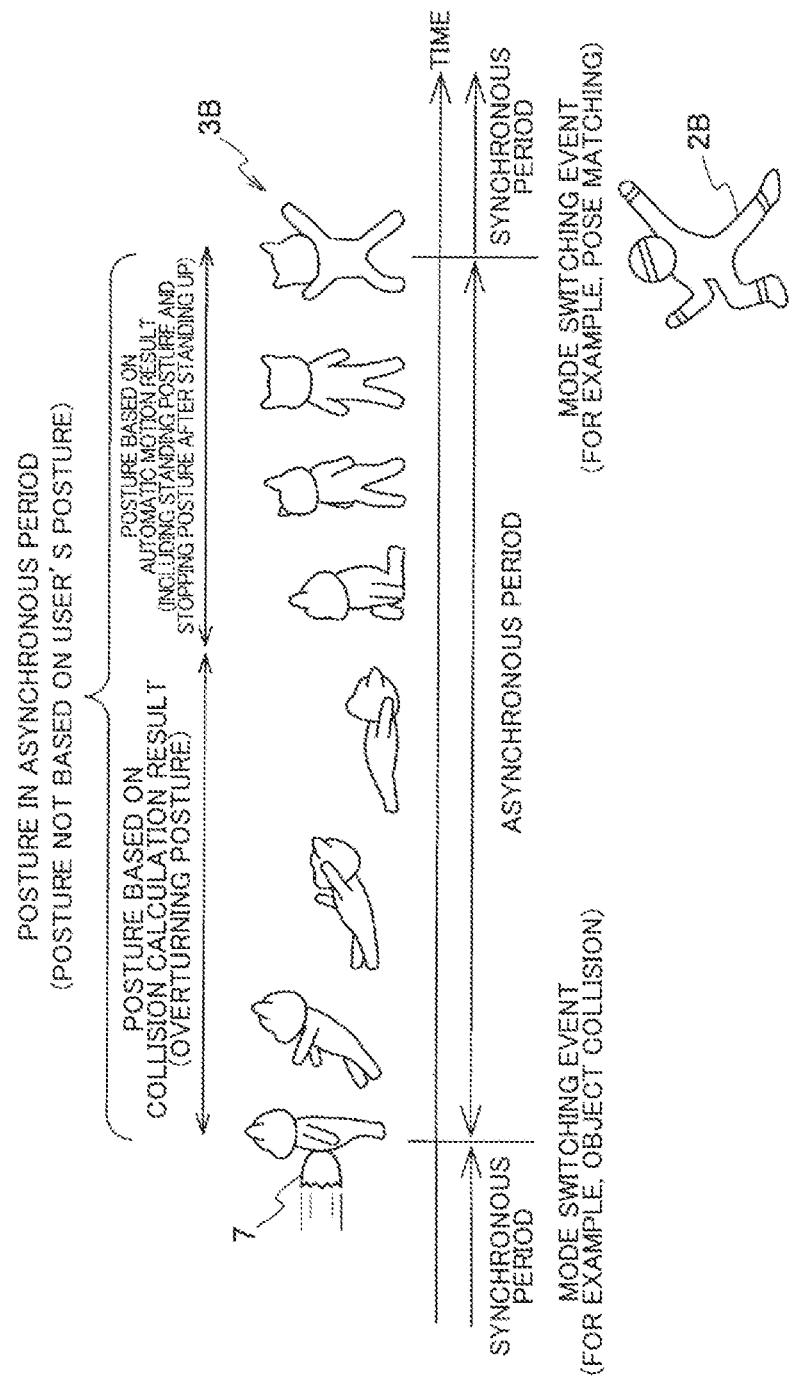
FIG. 5 is a diagram for explaining the motion of an operating object in an asynchronous mode.

FIG. 5 is a diagram explaining the motion of an operating object during an asynchronous mode. The posture of the operating object 3B shown in FIG. 4 is synchronized with the posture of the user 2B until the non-operating object 7 and the operating object 3B collide, and is asynchronized after the collision. Therefore, in FIG. 5, a collision is shown as a mode switching event that a synchronous mode is switched back to an asynchronous mode. After the collision, the operating object 3B moves as if it were pushed by the non-operating object 7. That is, a physical trajectory of the operating object 3B when receiving the force due to the collision is calculated, the operating object 3B moves along the trajectory, and finally enters an overturned state. In this way, the motion of the operating object 3B in the period from the collision to the overturning follows the trajectory calculated by physical calculation, so it is described as "physical calculation follow".

The operating object 3B in FIG. 5 performs a predetermined motion after being overturned, and finally stops in a specific posture (pose). Such a pose when the operating object stops during the asynchronous period is referred to as a synchronization waiting pose. The motion of the operating object 3B during the period from the overturning to the synchronization waiting pose is described as "automatic motion" because it does not depend on the motion of the user 2 or physical calculation. The content of the automatic motion is not particularly limited, and may be determined as appropriate.

It should be noted that there may be a plurality of synchronization waiting poses, and which synchronization waiting pose will be taken may be randomly determined, or may be determined based on the magnitude of the impact, the colliding object, the setting of the virtual space, and the like.

When the user takes a synchronization waiting pose, the information processing device 1 assumes that the posture of the user and the posture of the operating object match, and synchronizes the postures of both again. In FIG. 5, the user 2B is taking the same pose as the operating object 3B. As a result, both are resynchronized.

In addition, re-operation may be enabled more quickly. For example, even before the synchronization waiting pose is taken, re-operation may be enabled when the user takes the same posture as the operating object. For example, in the example of FIG. 5, when the operating object 3B has been overturned and is lying down, the user 2B may also lie down to enable re-operation. In this way, the user's desire to enable re-operation quickly is awakened, and the sense of immersion in the game increases.

Note that, during the asynchronous period, the appearance of the operating object may be changed in order to make the user aware that the operation is not accepted. For example, the color of the operating object may be changed. The transparency of the operating object may be increased so that the background behind the operating object can be seen. An effect may be performed in which a weapon, equipment, or the like held by the operating object is removed. The size of the operating object may be increased or decreased. The operating object may be replaced with a completely different object.

For example, there have been many stories in which the main character transforms into a completely different character. Such a story may be made into a game in a virtual space, and the operating object may be the character after the transformation in the synchronous mode, and the operating object may be the character before the transformation in the asynchronous mode. Alternatively, following a story in which pilots ride on vehicles such as robots and compete with each other, the operating object may be the vehicle in the synchronous mode, and the operating object may be the pilot in the asynchronous mode. That is, during the asynchronous period, the operating object that has been operated in the synchronous mode may not be displayed, and another object may take a synchronization waiting pose.

In the above description, the operating object stops and takes a synchronization waiting pose, but the synchronization waiting pose is not limited to the stopping state. For example, the synchronization waiting pose may be a periodic motion. For example, when the operating object is stepping and the user also steps, the operation mode may be switched back to the synchronous mode. Alternatively, when the operating object rotates like a figure skating spin and the user also rotate, the operation mode may be switched back to the synchronous mode.

In the above description, the mode is switched back to the synchronous mode when the user takes the same pose as the synchronization waiting pose, but in that case, the operating object may take another synchronization waiting pose. That is, when the user's posture is adjusted to a first synchronization waiting pose, the operating object takes a second synchronization waiting pose, and the user may need to adjust his or her posture to the second synchronization waiting pose. In this way, in order to switch back to the synchronous mode, the user may need to execute in order a plurality of synchronization waiting poses executed in order by the operating object. Alternatively, a plurality of synchronization waiting poses may be changed with the lapse of a predetermined period of time, and if the user does not adjust his or her posture to each synchronization waiting pose within the predetermined period of time, the switching back of the synchronous mode may fail. That is, re-operation may be enabled when the operating object performs a specific motion and the user follows the specific motion.

Note that switching from the asynchronous mode to the synchronous mode may require other conditions in addition to the synchronization waiting pose. For example, switching from the asynchronous mode to the synchronous mode may not be performed unless a signal from a specific device is received. For example, the user may be required to press a button on a specific device along with taking a synchronization waiting pose. For example, there are many games in which an operating object is equipped with a sword and swings the sword to defeat an enemy. In such a game, there are game devices that allow a user to give an instruction to swing a sword by swing a controller that resembles a sword. When the information processing device 1 is implemented using such a game device, not only the posture of the user but also the fact that the user is holding the controller may be a condition for switching to the synchronous mode. In this way, a signal from the specific device emitted by pressing a button of a specific device along with taking the synchronization waiting pose may be added to the conditions for mode switching.

Figure 6:
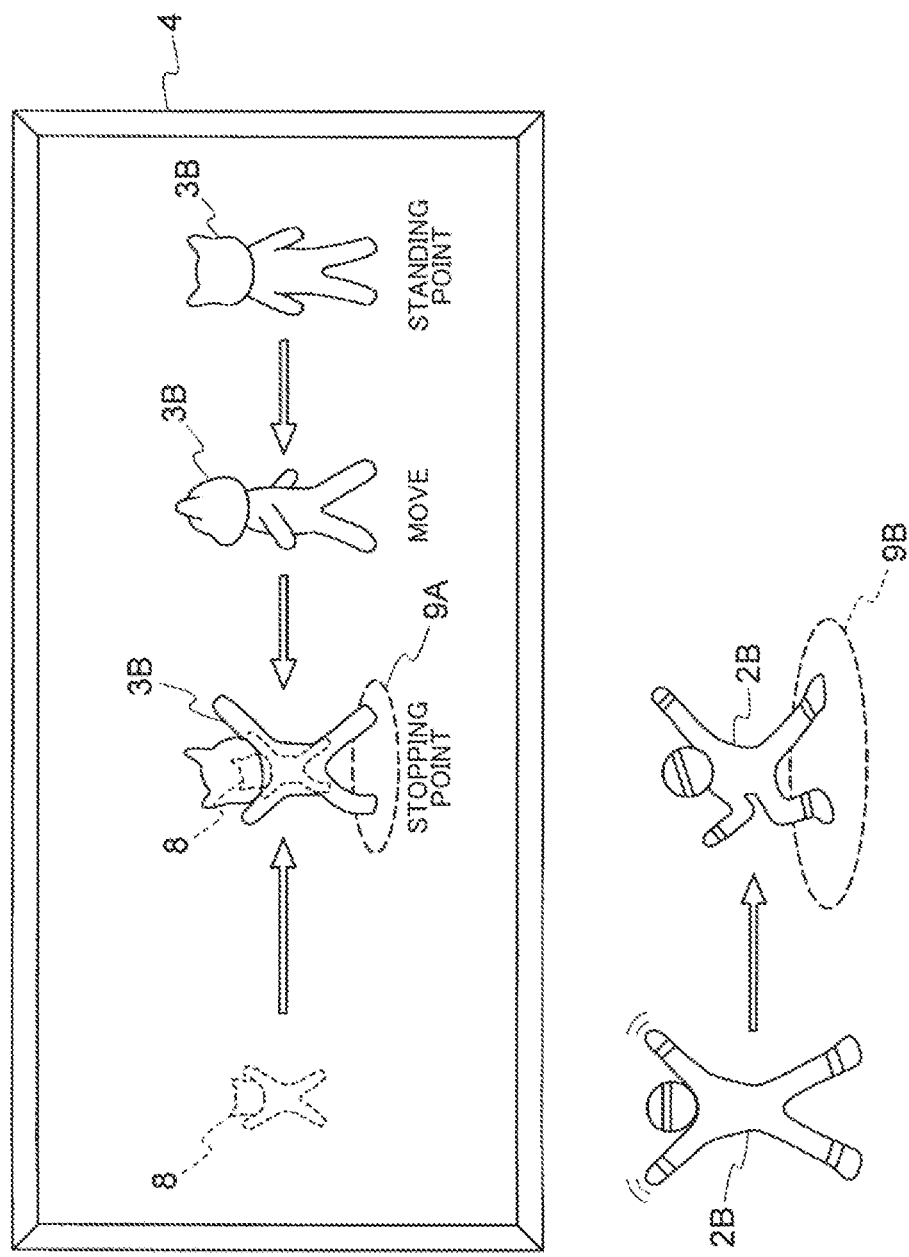
FIG. 6 is a diagram showing an example of a re-operation method using a user's position.

The user's position may be added to the conditions for switching to the synchronous mode. FIG. 6 is a diagram illustrating an example of a method of resynchronization using the user's position. In FIG. 6, the operating object 3B stands up from the overturned state, moves to a stopping point 9A, and then takes a pose. It is also assumed that the user 2B must move from the spot and take a pose in order to perform resynchronization before being able to operate again. By doing so, the element of "movement" can be incorporated into the game.

It should be noted that the user 2B may be requested to move to a predetermined point in reality 9B. Alternatively, it may be requested that the moving distance be equal to or greater than a specified value without specifying the destination. Alternatively, it may be requested to move to a specific point in a virtual space. At that time, a support object (second object), which is an object that assists the user's re-operation, may be generated. For example, when the information processing device 1 switches the operation mode to the asynchronous mode, a support object 8 as indicated by the dotted line in FIG. 6 is generated. The support object 8 in FIG. 6 moves according to the movement of the user 2B. After causing the user to match the positions of the support object 8 and the operating object 3B and taking a synchronization waiting pose, the re-operation of the operating object 3B may be enabled. Note that the moving distance of the support object 8 does not have to be the same as the moving distance of the user 2B. Note that the information processing device 1 deletes the support object 8 when re-operation of the operating object 3 is enabled.

Although the operating object 3B and the support object 8 in FIG. 6 are similar in appearance, if the user can recognize the support object, the support object and the operating object may be completely different in appearance like the appearance of the operating object in the asynchronous mode. For example, in the case of a game about a giant robot, the operating object may be the appearance of the giant robot, and the support object may be the appearance of the pilot riding the giant robot.

In FIGS. 4 to 6, it is assumed that the operating object is displayed in the image. However, in VR (Virtual Reality) using the head-mounted display 6A of FIG. 3, images from the user's viewpoint are often displayed. When switching to the synchronous mode occurs in the image from the user's viewpoint, the operating object is not displayed in the image in the synchronous mode, but the operating object is displayed in the image when it is switched to the asynchronous mode.

Figure 7:
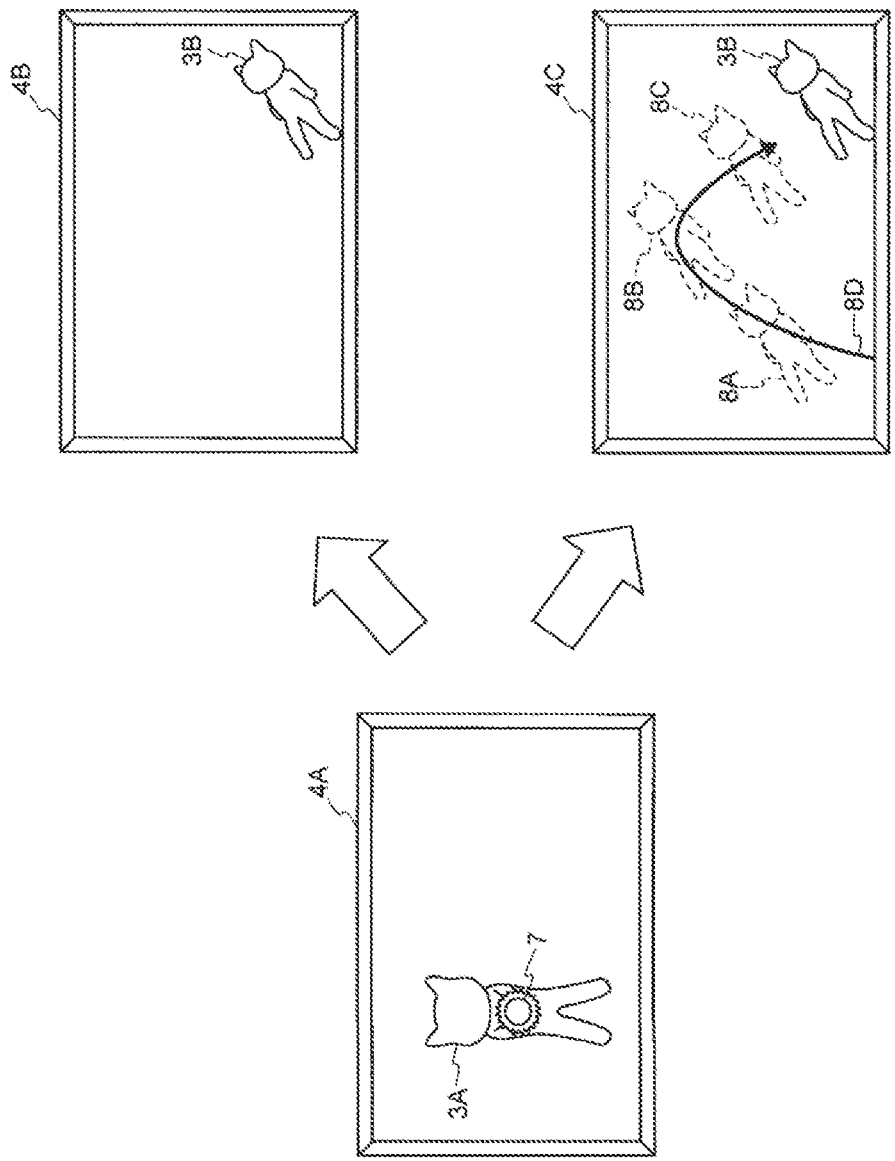
FIG. 7 is a diagram for explaining an image from a user's viewpoint.

FIG. 7 is a diagram illustrating an image from a user's viewpoint. The left side of FIG. 7 shows an image 4A representing the virtual space shown in FIG. 4 from the viewpoint of the operating object 3B. The upper-right side of FIG. 7 shows an image 4B showing that the operating object 3B has moved away from the position of the user 2 due to collision with the non-operating object 7. In the example of the robot described above, the user 2B has boarded and operated the operating object 3B, which is a robot, but since it collided with the non-operating object 7, the operating object 3B is separated from the user 2B and becomes visible. In such an image 4B, it is difficult to accurately grasp the user's own location, and to move to the position of the operating object 3B and adjust his or her posture. Therefore, in this case, the support object may be displayed to assist the user in moving to the position of the operating object.

The lower-right side of FIG. 7 shows an image 4C in which support objects 8A to 8D are displayed. The support objects 8A to 8C indicate the past positions of the operating object 3B, and the support object 8D indicates the trajectory of movement. In this way, the positional relationship between the position of the user 2B and the position of the operating object 3B can be recognized, and the user 2B can easily move to the position of the operating object 3B.

Note that the mode switching event is not limited to collision between objects. For example, when a user uses a specific item in a game, a mode switching event may be executed for another user's operating object. Alternatively, for example, an entry-prohibited area may be provided in the virtual space, and the mode switching event may be executed when the operating object attempts to enter the area. In this way, it is possible to suggest to the user that the destination is prohibited from entering. Alternatively, an object such as a wall may be provided to surround the entry-prohibited area, and the mode switching event may be executed when the operating object collides with the object.

In this way, the information processing device 1 requires time and effort such as pose and movement to re-operate the operating object. This effort is useful for adjusting the difficulty of the game, improving the pleasure of the game, and the like. For example, in a racing game, this time and effort causes time loss. Therefore, the user will prevent the operating object from colliding with other objects. Further, when requesting movement for re-operation, the faster the speed of the operating object, the longer the distance the operating object separates at the time of collision, so that the faster the speed, the longer the time required for re-operation. Therefore, the user adjusts the speed, and the pleasure of the game is improved.

It should be noted that the processing of the information processing device 1 described above is not necessarily used only for entertainment purposes. For example, it can also be used for educational purposes. For example, the user may perform an ideal motion that the user is trying to learn, and the information processing device 1 may determine whether the motion is ideal based on the motion of the operating object. If the motion is not ideal, the mode may be switched to the asynchronous mode, and the ideal motion may be indicated by an automatic motion. In this way, the user of the information processing device 1 can train for ideal motions. The ideal motion to be learned may be determined as appropriate. For example, it may be an exercise such as dancing, a medical procedure such as surgery, operating a machine, manufacturing an article, or the like.

The above processing is implemented by being shared by the constituent elements of the information processing device 1. Each process of the constituent elements of the information processing device 1 will be described.

The receiver 11 receives an operation signal for the virtual space generated by the information processing device 1. The operation signal may include the positional coordinates from the sensors. Signals for specific devices such as controllers may also be included. Other signals may be included.

The signal analysis unit analyzes the operation signal and recognizes an instruction to the virtual space. For example, the user's posture is recognized by synchronizing the positional coordinates from each sensor. Note that the user's position and moving distance may be calculated based on the user's posture and the amount of change thereof. Commands such as using items are also recognized. As described above, conventional techniques such as motion capture may be used for the processing of the signal analysis unit.

The virtual space generation unit 131 generates and manages a virtual space. For example, the virtual space generation unit determines the range of the virtual space and generates objects existing in the virtual space. In addition, the entry-prohibited area described above may be set in the virtual space. The generated objects include operating objects, non-operating objects, and support objects. The virtual space generation unit 131 also deletes objects, changes the appearance of objects, and the like. The generation of the virtual space may be the same as the technique employed in conventional game devices.

The instruction posture calculation unit 132 calculates an instruction posture for the operating object based on the user's posture recognized by the signal analysis unit. Since the user and the operating object have different body shapes, the posture of the user cannot be used as the posture of the operating object as it is. Therefore, the instruction posture calculation unit 132 calculates the posture of the operating object based on the posture of the user. A conventional technique such as motion capture may also be used for the calculation.

The posture of the operating object calculated by the instruction posture calculation unit 132 is not always the actual posture of the operating object. As described above, in the asynchronous mode, the posture of the operating object based on the user's posture is ignored. In addition, even in the synchronous mode, when the object is in contact with another object, although it is not a collision, part of the calculated posture of the operating object is changed to the actual posture of the object in order to make the posture more natural. Therefore, the posture of the operating object based on the posture of the user is described as an "instruction posture" as the posture instructed to the operating object.

The operation mode determination unit 133 performs switching of operation modes by the information processing device 1 described above. In other words, the operation mode determination unit 133 determines whether the operation mode is set to the synchronous mode or the asynchronous mode based on the operation mode switching condition. As described above, the operating mode switching condition may be the occurrence of a specific event, and the condition for determining whether an event has occurred may be determined as appropriate. Alternatively, the deviation from the ideal motion may be greater than or equal to a predetermined value. As described above, the specific events include collision, matching of the postures of the operating object and the posture of the operating object, matching of the positions of the support object and the operating object, movement of the user to a predetermined point, movement of the user, use of an item, and the like. The occurrence can be determined based on the positional relationship between objects, the moving distance, the posture of the object, the acceleration of the object, the instruction posture, the analysis result of the operation signal, and the like. Further, the deviation from the ideal motion may be calculated, for example, based on the distance between the position of each part in the ideal posture and the position of each part in the instruction posture at a certain point in time.

The object motion determination unit 134 performs the determination of the pose and position of the object by the information processing device 1 described above. In other words, the object motion determination unit 134 calculates changes in the position and posture of each object in the virtual space from the current time to the next specified time, and determines the position and posture of each object in the virtual space at the next time. The calculation method may be the same as that employed in conventional game devices. However, when the operation mode is determined to be the synchronous mode, the posture of the operating object is determined based on the instruction posture. That is, the posture of the operating object when instructed to change the posture of the operating object to the instruction posture is calculated, and the posture of the operating object is determined based on the calculation result. Further, when the operation mode is determined to be the asynchronous mode, the posture of the operating object is determined without being based on the instruction posture. Note that the position of the object may be calculated in consideration of the moving distance of the user. In other words, the object may be moved according to the movement of the user. The ratio between the moving distance of the user and the moving distance of the object may be determined appropriately. When the support object is generated, the support object may be moved to the past position of the operating object, as shown in FIG. 7.

The image generation unit 14 generates an image showing the posture of each object determined by the object motion determination unit. The method may be the same as the method employed in conventional game devices.

The transmitter 15 transmits the generated image to the image display device as shown in FIG. 3. As a result, the image shown in FIG. 4 or the like is viewed by the user through the image display device.

Figure 8:
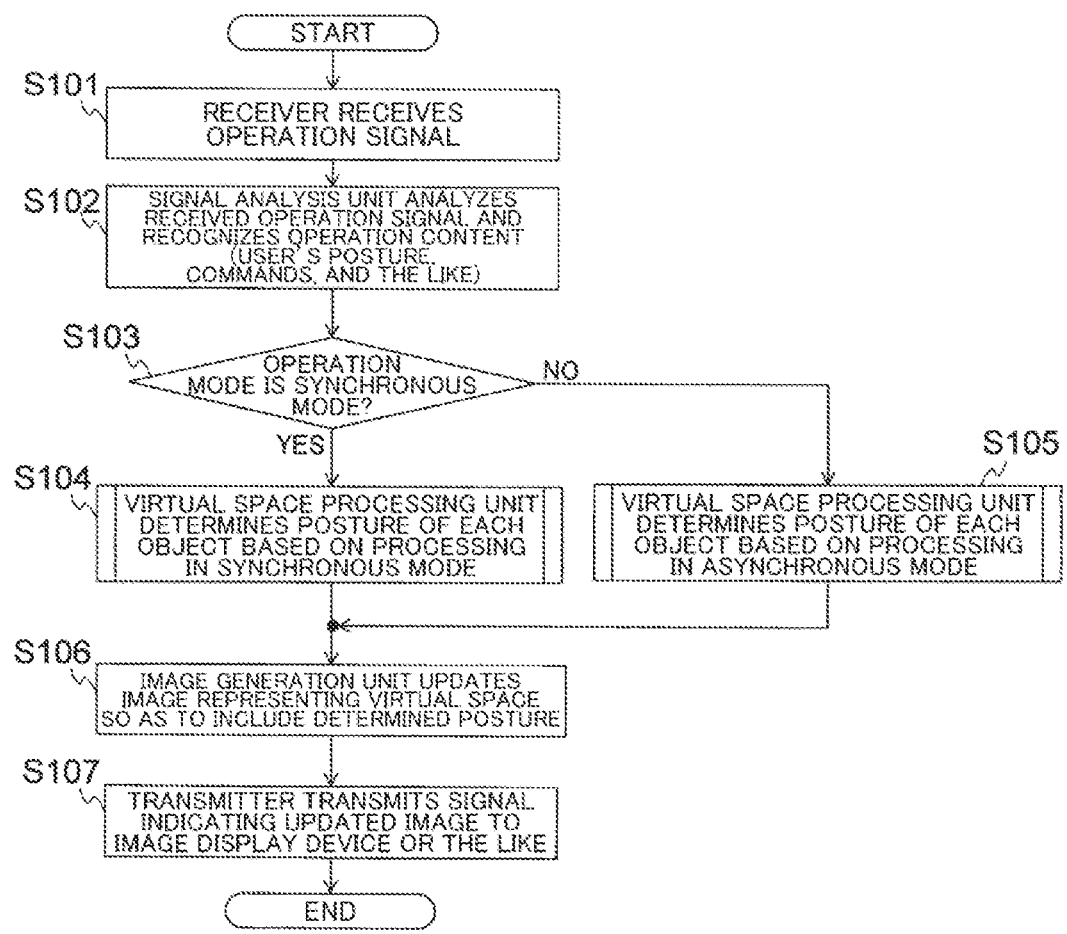
FIG. 8 is a flowchart of overall processing of the information processing device.

FIG. 8 is a flowchart of the overall processing of the information processing device 1. It is assumed that objects in the virtual space such as operating objects have already been generated. The flowchart of the present disclosure is an example, and each process does not necessarily have to be performed according to the above flow.

The receiver 11 receives an operation signal (S101). The signal analysis unit 12 analyzes the received operation signal and recognizes the content of the operation (S102). As described above, the operation content includes the user's posture and the like.

If the operation mode is the synchronous mode (YES in S103), the virtual space processing unit 13 determines the posture, position, and the like of each object in the virtual space based on the processing in the synchronous mode (S104). Such objects also include operating objects, non-operating objects, and support objects. Details of the processing will be described later. If the operation mode is not the synchronous mode (NO in S103), the virtual space processing unit 13 determines the posture, position, and the like of each object based on the processing in the asynchronous mode (S105). This processing will also be described later.

Since the motion of each object such as the operating object is determined by these processes, the image generation unit 14 updates the image representing the virtual space according to the determined motion (S106). The processing of the image generation unit 14 may be the same as that of the conventional game device. The transmitter 15 transmits a signal representing the updated image to the image display device (S107). As a result, an image showing such a virtual space as shown in FIG. 4 or the like is displayed.

This flow is repeated to update the posture of each object in the virtual space. In this flowchart, it is assumed that the operation signal is always received. However, if the operation signal is not received, the processing of S101 and S102 may be omitted, and it may be assumed that the user's posture remains the same. Alternatively, an error may be returned.

Figure 9:
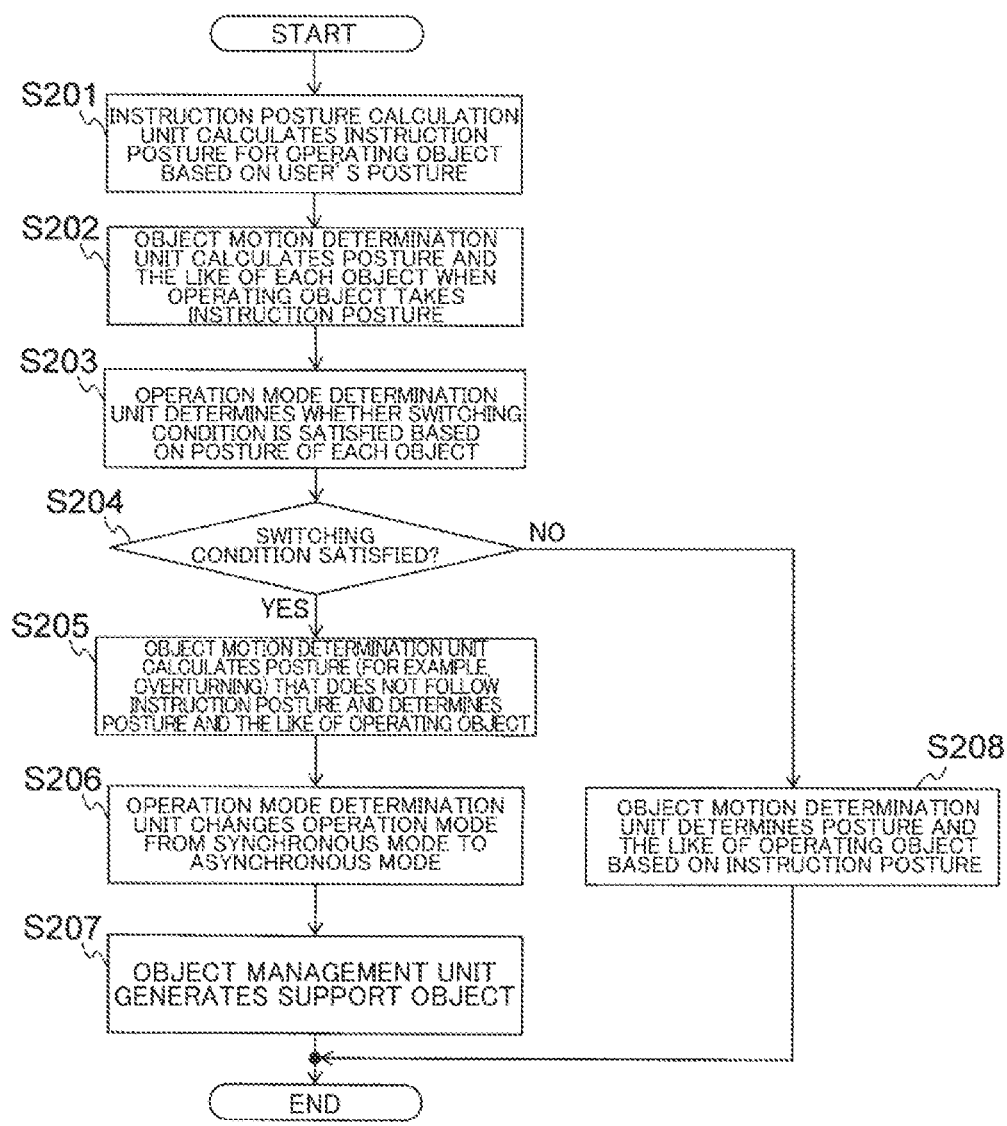
FIG. 9 is a flowchart of processing in a synchronous mode of a virtual space processing unit.

Next, details of processing in the synchronous mode of the virtual space processing unit 13 will be described. FIG. 9 is a flow chart of processing in the synchronous mode of the virtual space processing unit 13.

The instruction posture calculation unit 132 calculates the instruction posture for the operating object based on the user's posture (S201). The object motion determination unit 134 calculates the posture, position, and the like of each object when the operating object is in the instruction posture (S202). It should be noted that, as described above, the posture of the operating object does not have to completely match the instruction posture, and the posture of the operating object may partially differ from the instruction posture.

The operation mode determination unit 133 determines whether a condition for switching from the synchronous mode to the asynchronous mode is satisfied based on the calculated posture of each object (S203). For example, whether or not a collision has occurred may be determined based on the positional relationship between the operating object and another object. Alternatively, the determination may be made based on a predetermined condition, such as whether or not the difference between the acceleration of the operating object caused by the collision and the acceleration caused by the change in instruction posture is equal to or greater than a threshold.

If it is determined that the switching condition is satisfied (YES in S204), the object motion determination unit 134 calculates the posture and position using physical calculation such as, for example, overturning, to determine the posture, position, and the like of the operating object (S205). In this way, the posture of the operating object is determined regardless of the instruction posture. Then, the operation mode determination unit 133 changes the operation mode from the synchronous mode to the asynchronous mode (S206). The virtual space generation unit 131 generates a support object (S207). Note that this processing is omitted when no support object is generated. In this way, this flow ends, and processing in the asynchronous mode is performed thereafter.

On the other hand, if it is determined that the switching condition is not satisfied (NO in S204), the object motion determination unit 134 determines the posture of the operation target based on the instruction posture (S208). In this way, this flow ends, and processing in the synchronous mode is performed thereafter.

Figure 10:
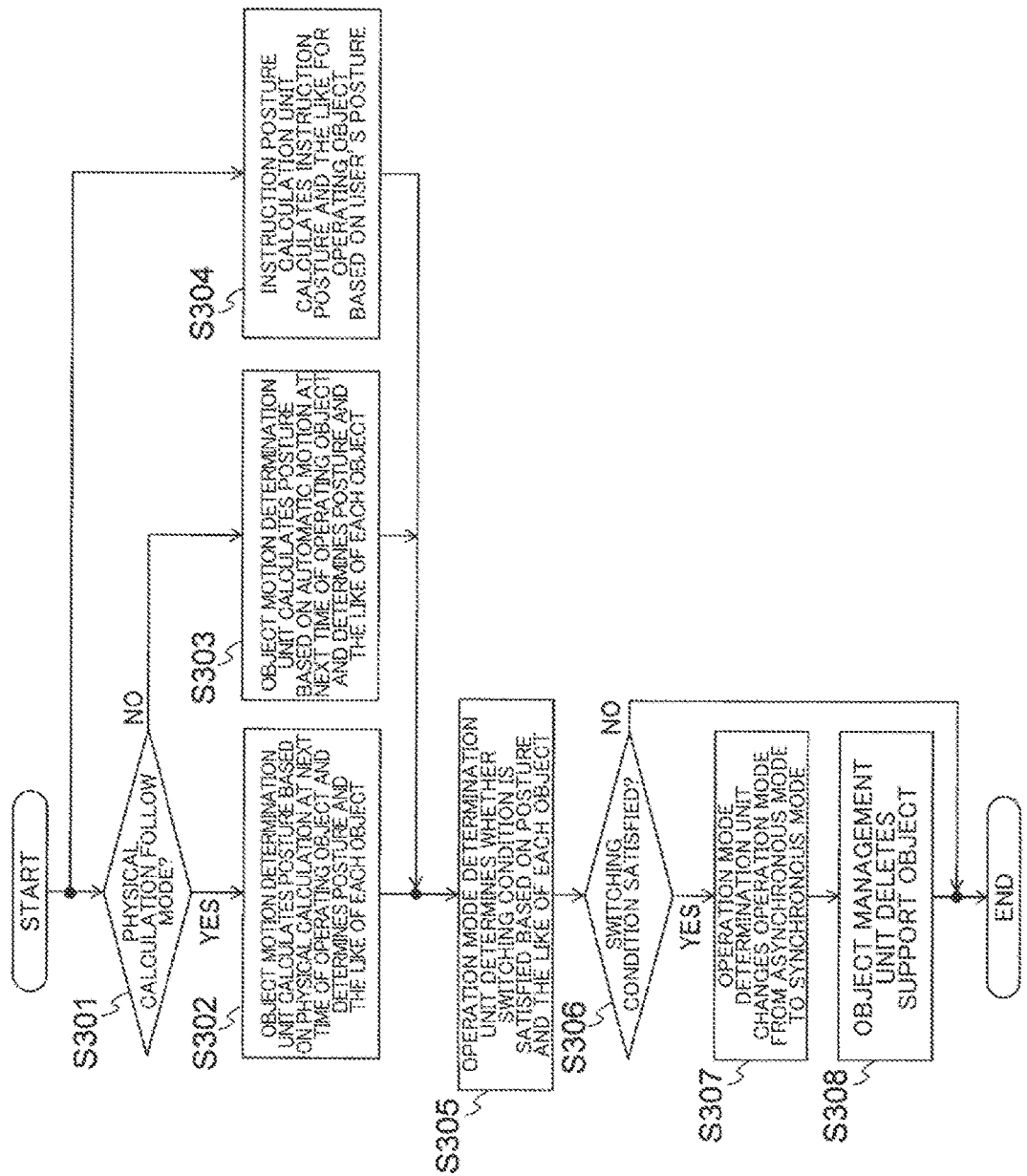
FIG. 10 is a flowchart of processing in an asynchronous mode of the virtual space processing unit.

Next, details of processing in the asynchronous mode of the virtual space processing unit 13 will be described. FIG. 10 is a flowchart of processing in the asynchronous mode of the virtual space processing unit 13.

The asynchronous mode is classified into a physical calculation follow mode and an automatic motion mode (including synchronization waiting pose), as described above. If the mode is in the physical calculation follow mode (YES in S301), the object motion determination unit 134 calculates the posture of the operating object based on the physical calculation at the next time point, for example, the overturning posture shown in FIG. 5, and determines the posture, position, and the like of each object (S302). If the mode is not in the physical calculation follow mode (NO in S301), that is, if the mode is in the automatic motion mode, the object motion determination unit calculates the posture of the operating object based on the next automatic motion, for example, the standing posture shown in FIG. 5, and determines the posture, position, and the like of each object (S303).

On the other hand, in parallel with the processing of the object motion determination unit, the instruction posture calculation unit calculates the instruction posture for the operating object based on the user's posture (S304). Then, the operation mode determination unit determines whether the condition for switching from the asynchronous mode to the synchronous mode is satisfied based on the calculated posture of the operating object, the instruction posture for the operating object, and the like (S305). For example, it is determined whether the calculated posture of the operating object and the instruction posture for the operating object match.

If it is determined that the switching condition is satisfied (YES in S306), the operation mode determination unit changes the operation mode from the asynchronous mode to the synchronous mode (S307). The object management unit deletes the support object (S308). Note that this process is omitted if no support object has been generated. In this way, this flow ends, and processing in the synchronous mode is performed thereafter. On the other hand, if it is determined that the switching condition is not satisfied (NO in S306), this flow ends without changing the mode. Therefore, processing in the asynchronous mode is also performed thereafter.

As described above, according to the present disclosure, when an operating object in a virtual space is operated based on the user's posture, the deviation between the postures of the user and the operating object caused by an action such as overturning is voluntarily eliminated by the user with the feel of a game. As a result, it is possible to prevent the user's sense of immersion in the virtual space from deteriorating.

The processing of the device in the embodiment of the present disclosure can be implemented by software (programs) executed by a CPU (Central Processing Unit) or GPU (Graphics Processing Unit), as in conventional motion capture, game devices, and the like. It should be noted that instead of executing all the processing of the device by software, part of the processing may be executed by hardware such as a dedicated circuit.

It should be noted that the above-described embodiments show examples for embodying the present disclosure, and the present disclosure can be implemented in various other forms. For example, various modifications, substitutions, omissions, or combinations thereof are possible without departing from the gist of the present disclosure. Such forms of modifications, substitutions, and omissions are included in the scope of the invention described in the claims and the scope of equivalence thereof, as included in the scope of the present disclosure.

The present disclosure may have the following configuration.

[1]
An information processing device comprising: an operation mode determination unit that determines an operation mode for a first object operated in a virtual space;
an instruction posture calculation unit that calculates an instruction posture for the first object; and
an object motion determination unit that determines the posture of the first object based on the instruction posture when the operation mode is determined to be a first operation mode and without being based on the instruction posture when the operation mode is determined to be a second operation mode, wherein the operation mode determination unit switches the operation mode to the first operation mode when the operation mode is the second operation mode and it is determined that the instruction posture satisfies a predetermined condition.

[2]
The information processing device according to [1], wherein the operation mode determination unit switches the operation mode to the first operation mode when the operation mode is the second operation mode and it is determined that the instruction posture matches the posture of the first object.

[3]
The information processing device according to [1] or [2], wherein the object motion determination unit causes the first object to take a predetermined pose when the operation mode is determined to be the second operation mode, and the operation mode determination unit switches the operation mode to the first operation mode when it is determined that the instruction posture matches the pose.

[4]
The information processing device according to any one of [1] to [3], wherein the operation mode determination unit switches the operation mode to the first operation mode when it is determined that a position or moving distance of the operator satisfies a predetermined condition and the instruction posture satisfies a predetermined condition.

[5]
The information processing device according to any one of [1] to [4], further comprising: an object generation unit that generates a second object that moves within the virtual space according to movement of the operator when the operation mode is switched to the second operation mode, wherein the operation mode determination unit switches the operation mode to the first operation mode when it is determined that a position of the second object matches a position of the first object and the instruction posture satisfies a predetermined condition.

[6]
The information processing device according to any one of [1] to [5], wherein the object motion determination unit changes the posture of the first object according to the instruction posture when the operation mode is determined to be the first operation mode.

[7]
The information processing device according to any one of [1] to [6], wherein the operation mode determination unit switches the operation mode from the first operation mode to the second operation mode when a predetermined event occurs in the virtual space.

[8]
The information processing device according to [7], wherein the operation mode determination unit determines occurrence of the event based on a positional relationship between the first object and a third object existing in the virtual space.

[9]
The information processing device according to any one of [1] to [8], wherein an appearance of the first object changes when the operation mode is switched.

[10]
The information processing device according to any one of [1] to [9], wherein the object motion determination unit causes the first object to take a plurality of poses in order when the operation mode is determined to be the second operation mode, and
the operation mode determination unit switches the operation mode to the first operation mode when it is determined that the instruction posture matches the plurality of poses in the order taken by the first object.

[11]
The information processing device according to any one of [1] to [10], wherein the operation mode determination unit switches the operation mode to the first operation mode when a signal from a predetermined object is received and it is determined that the instruction posture satisfies a predetermined condition.

[12]
The information processing device according to any one of [1] to [11], further comprising: an image generation unit that generates an image representing at least a partial area of the virtual space, wherein
the object motion determination unit moves the first object into the area when the operation mode is switched from the first operation mode to the second operation mode.

[13]
The information processing device according to [12], further comprising: an object generation unit that generates a fourth object after the operation mode is switched to the second operation mode, wherein
the object motion determination unit adjusts a position of the fourth object to a past position of the first object within the area.

[14]
The information processing device according to [12], further comprising: an object generation unit that generates a fifth object indicating a trajectory of movement of the first object within the area after the operation mode is switched to the second operation mode.

[15]
An information processing method comprising: determining an operation mode for a first object operated in a virtual space;
calculating an instruction posture for the first object based on a posture of an operator of the first object; and
determining the posture of the first object based on the instruction posture when the operation mode is determined to be a first operation mode and without being based on the instruction posture when the operation mode is determined to be a second operation mode, wherein
the operation mode is switched to the first operation mode when the operation mode is the second operation mode and it is determined that the instruction posture satisfies a predetermined condition.

[16]
A program comprising: determining an operation mode for a first object operated in a virtual space;
calculating an instruction posture for the first object based on a posture of an operator of the first object; and
determining the posture of the first object based on the instruction posture when the operation mode is determined to be a first operation mode and without being based on the instruction posture when the operation mode is determined to be a second operation mode, wherein
the operation mode is switched to the first operation mode when the operation mode is the second operation mode and it is determined that the instruction posture satisfies a predetermined condition.

REFERENCE SIGNS LIST

1 Information processing device
1A Portable information processing device
1B Fixed information processing device
11 Receiver
12 Signal analysis unit
13 Virtual space processing unit
131 Virtual space generation unit
132 Instruction posture calculation unit
133 Operation mode determination unit
134 Object motion determination unit
14 Image generation unit
15 Transmitter
2, 2A, 2B User
3, 3A, 3B Operating object
4, 4A, 4B, 4C Image
5 Sensor
6A Head-mounted display
6B Monitor
6C Projector
7 Non-operating object
8, 8A, 8B, 8C, 8D Support objects
9A Stopping point of operating object
9B Predetermined point in reality

The invention claimed is:
1. An information processing device, comprising:
circuitry configured to:
determine an operation mode for a first object operated in a virtual space;
calculate an instruction posture for the first object based on a posture of an operator of the first object;
determine a posture of the first object based on the instruction posture in a case where the operation mode is a first operation model;

determine the posture of the first object without being based on the instruction posture in a case where the operation mode is a second operation mode;

generate a second object in the case where the operation mode is the second operation mode;

move the second object within the virtual space based on a movement of the operator; and switch the operation mode from the second operation mode to the first operation mode in a case where the instruction posture satisfies a first condition and a position of the second object matches a position of the first object.

2. The information processing device according to claim 1, wherein the circuitry is further configured to switch the operation mode from the second operation mode to the first operation mode in a case where the instruction posture matches the posture of the first object.

3. The information processing device according to claim 1, wherein the circuitry is further configured to:

control the first object to take a specific pose in the case where the operation mode is the second operation mode, and switch the operation mode from the second operation mode to the first operation mode in a case where the instruction posture matches the specific pose.

4. The information processing device according to claim 1, wherein the circuitry is further configured to switch the operation mode from the second operation mode to the first operation mode in a case where a position or a moving distance of the operator satisfies a second condition and the instruction posture satisfies the first a condition.

5. The information processing device according to claim 1, wherein the circuitry is further configured to change the posture of the first object based on the instruction posture in the case where the operation mode is the first operation mode.

6. The information processing device according to claim 1, wherein the circuitry is further configured to switch the operation mode from the first operation mode to the second operation mode in a case where a specific event occurs in the virtual space.

7. The information processing device according to claim 6, wherein the circuitry is further configured to determine an occurrence of the specific event based on a positional relationship between the first object and a third object existing in the virtual space.

8. The information processing device according to claim 1, wherein an appearance of the first object changes based on the switch of the operation mode.

9. The information processing device according to claim 1, wherein the circuitry is further configured to:

control the first object to take a plurality of poses in order in the case where the operation mode is the second operation mode, and switch the operation mode from the second operation mode to the first operation mode in a case where the instruction posture matches the plurality of poses in the order taken by the first object.

10. The information processing device according to claim 1, wherein the circuitry is further configured to switch the operation mode from the second operation mode to the first operation mode in a case where a signal from a specific object is received and the instruction posture satisfies the first condition.

11. The information processing device according to claim 1, wherein the circuitry is further configured to:

generate an image representing the virtual space, and move the first object in the image in a case where the operation mode is switched from the first operation mode to the second operation mode.

12. The information processing device according to claim 11, wherein the circuitry is further configured to:

generate a fourth object after the operation mode is switched to the second operation mode, and adjust a position of the fourth object to a past position of the first object within the image.

13. The information processing device according to claim 11, wherein the circuitry is further configured to generate a fifth object indicating a trajectory of movement of the first object within the image after the operation mode is switched to the second operation mode.

14. An information processing method; comprising:

determining an operation mode for a first object operated in a virtual space;

calculating an instruction posture for the first object based on a posture of an operator of the first object;

determining a posture of the first object based on the instruction posture in a case where the operation mode is a first operation model;

determining the posture of the first object without being based on the instruction posture in a case where the operation mode is a second operation mode;

generating a second object in the case where the operation mode is the second operation mode;

moving the second object within the virtual space based on a movement of the operator; and switching the operation mode from the second operation mode to the first operation mode in a case the instruction posture satisfies a specific condition and a position of the second object matches a position of the first object.

15. A non-transitory computer-readable medium having stored thereon, computer-executable instructions which, when executed by a computer, cause the computer to execute operations, the operations comprising:

determining an operation mode for a first object operated in a virtual space;

calculating an instruction posture for the first object based on a posture of an operator of the first object;

determining a posture of the first object based on the instruction posture in a case where the operation mode is a first operation model; and determining the posture of the first object without being based on the instruction posture in a case where the operation mode is a second operation mode;

generating a second object in the case where the operation mode is the second operation mode;

moving the second object within the virtual space based on a movement of the operator; and switching the operation mode from the second operation mode to the first operation mode in a case where the instruction posture satisfies a specific predetermined condition and a position of the second object matches a position of the first object.

* * * * *